United States Patent [19]
Keltz

[11] 3,812,417
[45] May 21, 1974

[54] VOLTAGE REGULATING SYSTEM

[76] Inventor: Laurence Keltz, R.D. No. 1 Box 466, Malvern, Pa. 19355

[22] Filed: Nov. 16, 1972

[21] Appl. No.: 307,073

[52] U.S. Cl. .................... 322/55, 310/241, 307/5, 307/63
[51] Int. Cl. ............................................ H02p 9/02
[58] Field of Search ............... 322/54, 55; 310/241; 307/5, 43, 63, 77

[56] References Cited
UNITED STATES PATENTS

| | | | |
|---|---|---|---|
| 1,501,878 | 7/1924 | Burke | 322/54 X |
| 1,640,917 | 8/1927 | Arnest | 322/55 X |
| 302,460 | 7/1884 | Wood | 322/55 |
| 2,683,231 | 7/1954 | MacFarlane et al. | 322/55 X |
| 2,615,936 | 10/1952 | Glass | 307/77 |

*Primary Examiner*—James D. Trammell
*Attorney, Agent, or Firm*—Paul Maleson; Morton J. Rosenberg

[57] ABSTRACT

A voltage regulating system for producing a resultant voltage vector of predetermined magnitude and phase relation with respect to an incoming source signal. The regulating system includes a motor mechanism which is driven from an AC source signal having a reference phase angle. The motor is mechanically connected to a generator which comprises both a stator and a rotor which is rotatably secured to the motor mechanism to produce a generator output signal. There is included a mechanism for mechanically rotating the stator with respect to the rotor to produce the generator output signal which has a predetermined phase angle value with respect to the source signal reference phase angle value. The generator mechanism may be electrically connected to an inverter circuit to produce an inverter signal which when combined with a source output signal across a load results in a resultant voltage signal dependent upon the predetermined rotation of the stator with respect to the rotor of the generator mechanism.

5 Claims, 10 Drawing Figures

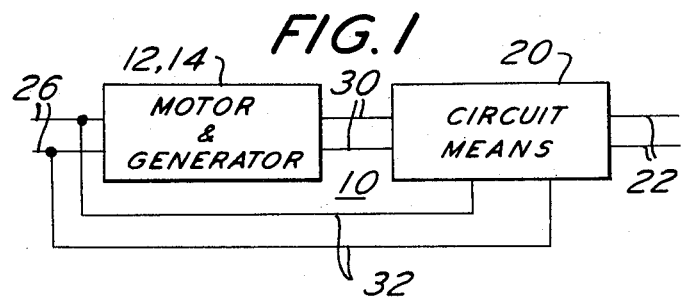
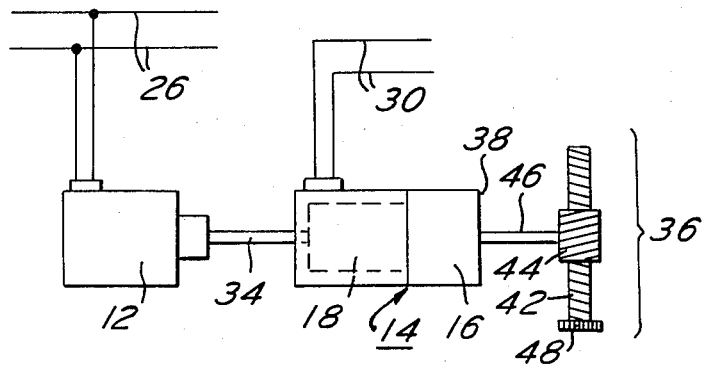
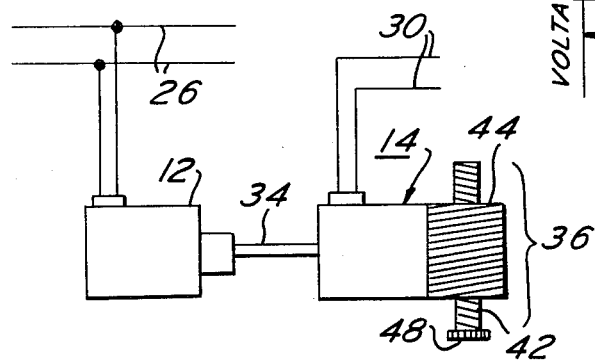
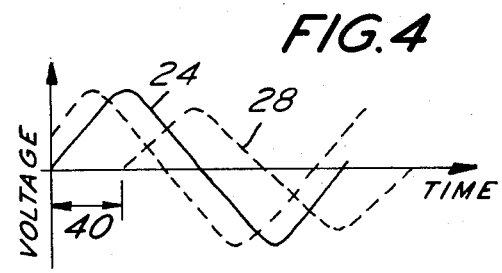
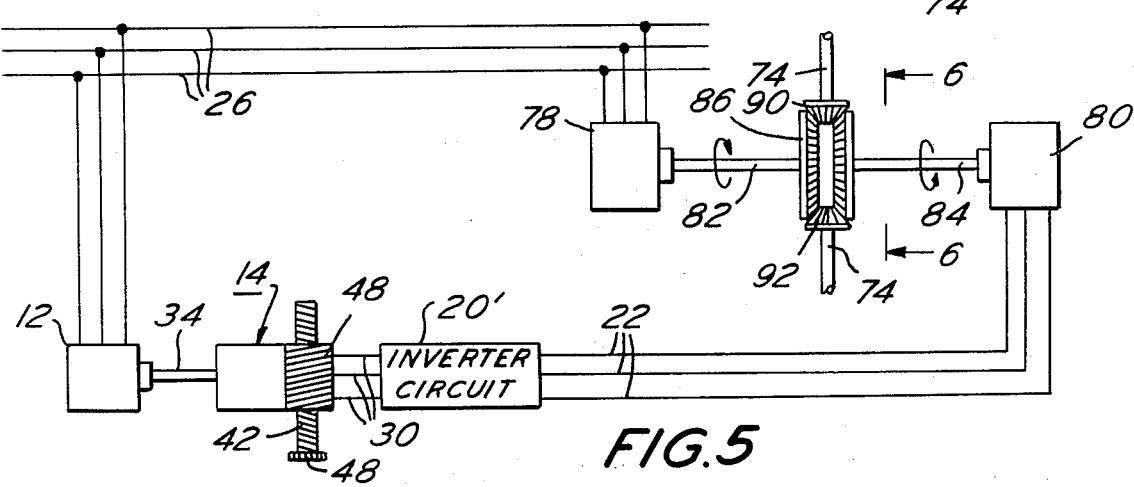

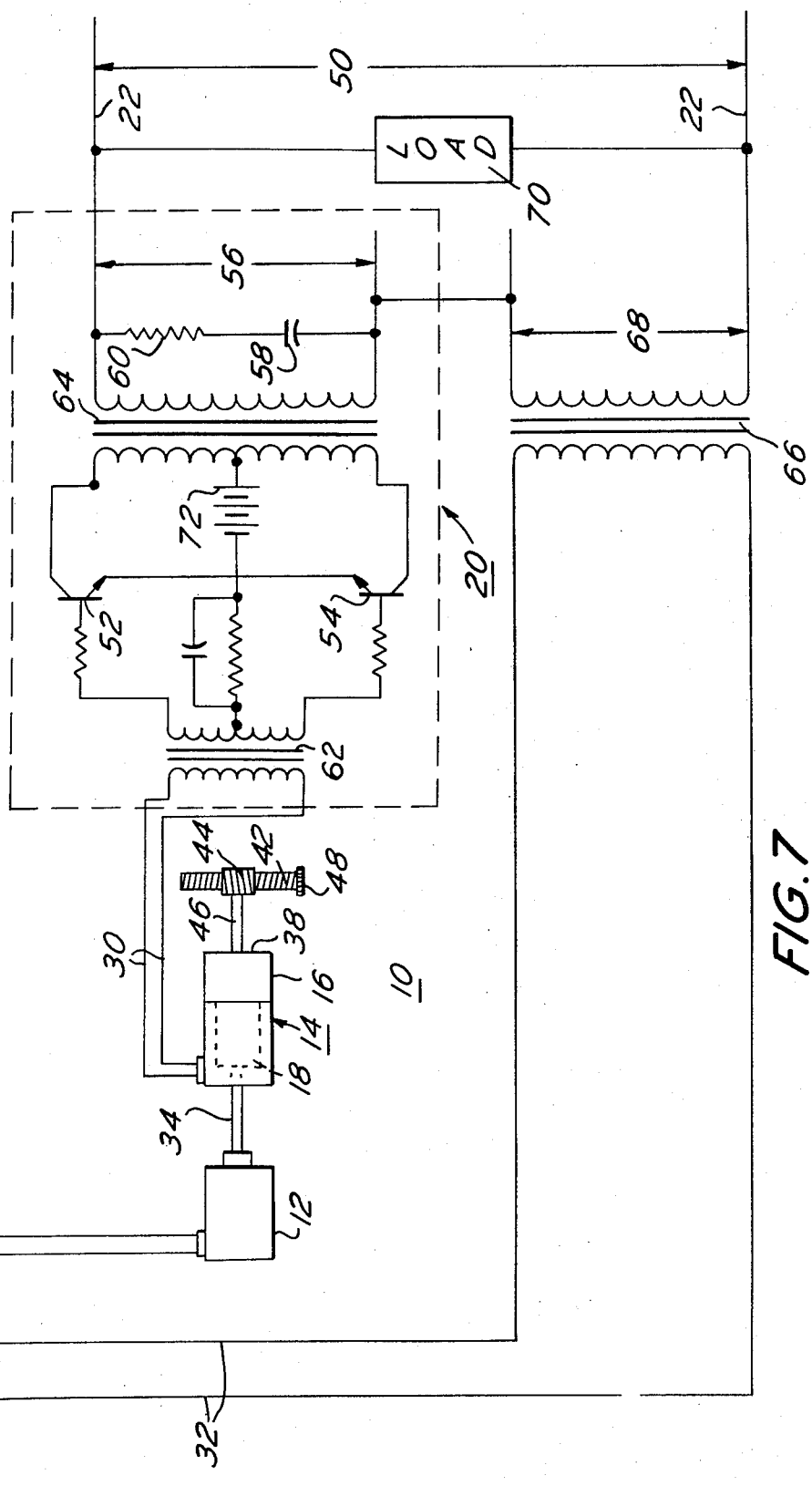

VOLTAGE REGULATING SYSTEM

BACKGROUND OF THE INVENTION

1. Field of the Invention

This invention relates to the field of voltage regulating systems.

2. Prior Art

Voltage regulation devices and methods of voltage regulation are known in the art. Some of such prior devices rely on the use of field variation on a generator to regulate voltage characteristics. However, such a device involves the changing of the voltage for the entire load on the generator. This necessitates control of the total generator load voltage whereas in many cases it is desirable to control only a portion of the generator load or to control separate portions of the generator load independently.

Other prior voltage regulation devices are known such as induction voltage regulators. Such devices involve the rotation of a heavy armature having a high inertia. The increased inertia limits the speed of response. However, such prior devices have the disadvantage of having a high mechanical wear factor which necessitates continual maintenance resulting in an increased cost of operation. Another disadvantage in the use of a device of this type is that there is often a wave signal distortion detected in the output of the induction voltage regulator device.

Another prior voltage regulation device is the tap changing under load regulator which utilizes a motor driven switch to periodically short out sections of a transformer winding. In such devices, mechanical wear from the deterioration of the electrical contacts necessitates increased maintenance and provides for a high cost of operation. Additionally, the voltage output from a tap changing regulator is displaced in definite steps as sections of the transformer winding are shorted and not in a continuous rate as is desirable in numerous applications.

Other voltage regulation devices such as saturable core reactor regulators control voltage by connecting an iron core reactor in series with a load. The reactance is then controlled by varying the degree of saturation of the core through a change in the supply to a DC winding. However, in such devices the power factor is reduced in proportion as the voltage to the load is reduced which results in a distortion of the output voltage wave form as the core is saturated.

Other prior devices such as static regulators may utilize vacuum tubes and solid state devices. However, such devices have the disadvantage of distorting the output wave form which may be objectionable for specific load applications. In such cases, the distorted wave form may reflect harmonics on the AC supply line that possibly may fall in the audible range. Where telephone lines parallel the AC transmission lines serious communication interference has often resulted.

SUMMARY OF THE INVENTION

A voltage regulation system which includes a motor mechanism driven from an AC source signal having a first phase angle. A generator mechanism comprising a stator and a rotor which is rotatably secured to the motor mechanism produces an output signal. A mechanism for rotating the stator with respect to the rotor produces the output signal with a predetermined second phase angle value with respect to the source signal first phase angle.

BRIEF DESCRIPTION OF THE DRAWINGS

FIG. 1 is an electrical block diagram showing the voltage regulation system electrical connections between the motor, generator and the electrical circuit;

FIG. 2 is an elevational view showing the motor connected to the generator and the gearing mechanism for angularly displacing the stator with respect to the rotor of the generator;

FIG. 3 is an elevational view of the motor and generator showing an embodiment of the stator actuating mechanism;

FIG. 4 is a graph showing a phase angle relation between a source signal and a generator output signal;

FIG. 5 is an elevational view of the voltage regulation system adapted to displace a shaft through a predetermined angular movement;

FIG. 6 is a sectional view of the shaft movement mechanism of FIG. 5, taken along the section line 6—6 of FIG. 5;

FIG. 7 is a combined elemental and circuit diagram of the voltage regulation system; and, FIGS. 7a, 7b and 7c are voltage vector diagrams showing resultant voltage signal vectors as a function of the vector sum of inverter signal and source output signal vectors.

DESCRIPTION OF THE PREFERRED EMBODIMENTS

Referring now to FIGS. 1–7 there is shown voltage regulation system 10 to produce a resultant voltage signal across lines 22 of any predetermined magnitude as well as to permit adjustment of its phase relationship to any other voltage signal vector. In general, voltage regulation of system 10 may be characterized by the overall block diagram shown in FIG. 1. AC source signal 24 (shown in FIG. 4) having some reference of phase angle is input into motor and generator block 12, 14 through source input lines 26. As will be described in the following paragraphs, component portions of generator 14 are mechanically displaced to produce generator output signal 28 in a predetermined phase relationship to AC source signal 24. Generator output signal 28 is then inserted into block 20 representing an electric circuit, one type of which is shown in FIG. 7 and is represented by block 20 of FIG. 1. Output signal 28 enters block 20 through generator output lines 30 as is shown. Additionally, source signal 24 is inserted through secondary lines 32 into electrical circuit 20 to produce a mechanism where the resultant voltage signal measured across resultant voltage signal lines 22 becomes the vectoral sum of source signal 24 and generator output signal 28. In this manner, a resultant voltage signal may be produced having a predetermined magnitude and phase relationship to any other voltage signal in the system, thus producing a voltage regulation system 10 which allows regulation of resultant voltage signals in both magnitude and phase relation.

The mechanical driving elements of voltage regulation system 10 is clearly shown in FIG. 2. AC source signal 24 is input into motor means 12 which may be synchronous, through source input lines 26. Motor 12 actuates motor shaft 34 causing a rotary motion. Shaft 34 is rotationally connected to generator means 14 in general, and rigidly restrained to rotor 18 contained within generator 14. Therefore, as in the standard operation of any generator means, motor 12 rotationally moves rotor 18 within generator 14. Stator 16 remains fixed in positional relation with respect to an external environment reference while rotor 18 is being rotationally actuated. In this manner, as was the case in the prior art, generator output signal 28 will be produced through output lines 30 having some phase angle 40 relation to source signal 24.

In order to produce phase angle 40 having a predetermined relation between signals 24 and 28, it is seen in FIG. 2 that gearing mechanism 36 is connected to stator 16 for producing a relative angular displacement between rotor 18 and stator 16 of generator 14. Gearing mechanism 36 includes thumb screw 42 having worm teeth formed therein. The gear teeth of thumb screw 42 are mated to and threadedly engage worm teeth on worm wheel 44 to actuate gear shaft 46. Gear shaft 46 is rigidly constrained on opposing ends to worm wheel 44 and stator casing wall 38. Therefore, rotation of worm wheel 44 in a particular plane of motion actuates movement of casing wall 38 in a parallel plane. Knob 48 which is fixedly secured to thumb screw 42 may be manually actuated in a plane substantially normal to the rotation of plane of casing wall 38 to move stator 16 in a predetermined relative angular displacement to rotor 18. In this manner, generator signal 28 may be produced having any predetermined phase angle 40 with respect to source signal 24 that may be desired by an operator.

An embodiment of the present invention is shown in FIG. 3 where worm wheel 44 of FIG. 2 is substituted for by means of gear teeth formed directly on stator casing wall 38. In this form of the mechanical aspect of voltage regulation system 10, it is seen that thumb screw 42 actuated by knob 48 acts in direct relation and contact with stator 16 to produce the predetermined relative angular displacement between rotor 18 and stator 16 of generator 14. It should be noted, that the two forms of the system 10 as shown in FIGS. 2 and 3 provide for movement or rotation of stator 16 in a plane of motion substantially orthogonal to the plane of motion of the manual actuation of knob 48. However, it is to be understood that casing wall 38 may be rotationally moved through a number of mechanical mechanisms such as a shaft extension directly from casing wall 38 or some like means which may or may not affect the planes of motion between stator casing wall 38 and some manual actuating knob 48. The important area of consideration in voltage regulation system 10 being that stator 16 is able to be angularly displaced with respect to rotor 18 through a mechanism to produce phase angle 40 changes in a predetermined manner between source signal 24 and generator output signal 28.

FIG. 7 shows motor and generator 12, 14 electrically connected to electric circuit 20 which is enclosed within the dotted lines. The components of circuit 20 are shown and represent block 20 of FIG. 1. It is to be understood that the enclosed circuit shown in FIG. 7 is well known in the art and no claim is made to the invention of this type of circuit which is commonly known or referred to as an inverter circuit. However, as will be shown when inverter circuit 20 is electrically connected to generator 14 through generator output lines 30 as well as to AC source signal 24 through secondary lines 32, there is produced resultant voltage signal 50 which has a predetermined magnitude and phase relation as desired for a particular application.

Inverter circuit 20 as is shown and as is well known in the art may produce an alternating square wave signal in conjunction with the firing of solid state devices 52, 54. Circuit 20 shown in FIG. 7 does not purport to produce a sine wave output inverter signal 56 although capacitors 58 and resistors 60 are included as is commonly used to reduce voltage spikes and surges. Circuit 20 may have filter circuits which are well known in the art added thereto which may modify the resulting square-wave output of such a solid state inverter to simulate a pure sine wave to any predetermined accuracy necessitated by the particular application.

Generator 14 is electrically connected to driver transformer 62 through generator output lines 30. Driver transformer 62 alternately fire solid state devices 52 and 54 to pass a signal through inverter transformer 64 thereby creating inverter signal 56. AC source signal 24 passing through AC source input lines 26 is diverted through secondary voltage lines 32 and are input into power transformer 66 thereby producing source output signal 68 as is shown. Source output signal 68 is then summed with inverter signal 56 across load 70 to produce resultant voltage signal 50. As is seen voltage signal passing through secondary lines 32 is coincident with the input source signal 24 entering synchronous motor 12.

FIGS. 7a, 7b, and 7c show vector diagrams of inverter signal 56 and source output signal 68 being added to form resultant voltage signal 50 in various states. In FIG. 7b there is shown the voltage range for resultant voltage signal 50 when source output signal 68 is made substantially equal to inverter signal 56. Here it is evident that when the voltage vector 56 is rotated to an in-phase position but bucking or oppositely displaced to source output signal 68, the voltage to load 70 which is the resultant voltage signal 50 is substantially reduced to zero. When source output signal 68 and inverter signal 56 are in-phase and additive then it is seen that resultant voltag signal 50 is equal to substantially two times source output signal 68. In FIG. 7a there is shown how load or resultant voltage signal 50 may be varied over a lesser range by essentially making inverter signal 56 less then the source output signal 68. FIG. 7c vector diagram details how load voltage 50 may be varied over a larger range by essentially making inverter signal 56 greater than source output signal 68. In this case load voltage 50 is at a minimum value when it is 180° rotationally displaced as compared to its vector position at a maximum value. Of interest to be noted is that under the conditions shown in FIGS. 7a and 7c, load voltage 50 cannot be reduced to a zero value. Only when source output signal 68 is made substantially equal to inverter signal 56 as shown in FIG. 7b can load voltage 50 be reduced to a substantially zero value. Of importance to the inventive concept is that substantially no or little distortion is introduced as voltages are regulated. However, progressive distortion is inherent in prior art circuits where delayed firing of solid state devices are employed which have been the technique commonly used in static voltage regulators used heretofore.

FIG. 7 has essentially shown a small synchronous motor 12 in combination with generator 14 with provision for rotating stator 16 of generator 14 by means of gearing mechanism 36 described clearly in FIGS. 2 and 4. Although motor 12 and generator 14 as well as circuit 20 are well known in the art it is evident that the rating of generator 14 should be sufficient to produce the energy necessary to fire the solid state devices, transistors, or controlled rectifiers which are shown in circuit 20. It is evident that the solid state devices 52, 54 will be fired at the frequency of generator 14 which must be the same as the frequency of source signal 24 since generator 14 is driven by synchronous motor 12. Thus, the frequency of inverter signal 56 is substantially identical to the frequency of source signal 24. As has been described, rotating stator 16 by means of gearing mechanism 36 produces inverter signal 56 which may be displaced in phase relation from source output signal 68 through any desired angle. From the circuit diagram of FIG. 7 it is seen that load voltage 50 will be the vector sum of inverter signal 56 and source output signal 68. Additionally, vector diagrams shown in FIGS. 7a, 7b, and 7c illustrate the ranges through which load or resultant voltage signal 50 may be made to vary. Although FIG. 7 illustrates only a single phase source 24, it is apparent and to be understood that multi-phase operation is possible by providing an inverter for each phase. It is further to be understood that a single multi-phase motor-generator set may be used for control operations. This may take place through use of a single three-phase synchronous motor-generator set which may be used to control a three-phase voltage regulator.

FIG. 7 further shows battery 72 as the source of DC power. However, it is to be understood that any source of DC power such as a rectifier circuit or fuel cell might be employed within circuit 20. If a rectifier circuit is fed from source output signal 68, then system 10 would be a completely self contained unit deriving its power from one source. The inverter circuit 20 as shown is intended to be a typical circuit for an inverter and can be driven from an AC source such that the output frequency is identical with the frequency of the AC source voltage signal 24. Additionally, FIGS. 1 through 8 show provision for manual adjustment of voltage signals by the turning or actuation of gear mechanism 36. It is obvious that gearing mechanism 36 or other means to move stator 16 with respect to rotor 18 could be used. One of such techniques could utilize the movement of stator 16 through use of a torque motor or lever system with sensing mechanisms from any chosen source signal in order that the output voltage could be made to vary with the quantity sensed.

FIGS. 5 and 6 illustrate the use of voltage regulation system 10 in order to move either one or a pair of shafts 74 through a predetermined angular displacement angle 76. In essence this shows the application of system 10 to a very sensitive frequency relay where one frequency may be compared with another. Motor 12 is electrically connected to source or power lines 26 on one end and generator 14 on an opposing end. Gearing mechanism 36 is shown to provide the mechanism whereby the voltage signal leaving generator 14 may be varied within electrical conducting lines 30. Inverter circuit 20' shown in block form is connected a synchronous motor 80 which is rotating in a first direction. Synchronous motor 78 is adapted to rotate in a second direction opposing the direction of synchronous motor 80. Synchronous motor 78 is in turn connected to incoming power lines 26. First and second motor shafts 82, 84 therefore turn in opposing directions and may be adapted to rotate at equal rotational speeds. Each of synchronous motor shafts 82, 84 are attached on one end to respective synchronous motors 78 and 80 and on an opposing end to pinion gears 86, 88. Bevel gears 90, 92 mate with, and are actuated by rotation of pinion gears 86, 88. With synchronous motors 78, 80 turning in opposite directions, and at the same speed permits the axis of shaft 74 to remain in a fixed position although rotating around the longitudinal axis thereof. By initiating action of gear mechanism 36 to change the phase position of the inverter output signal, shaft 74 may be rotated through a shaft movement angle 76 which would be the angle of phase displacement of the inverter output from the incoming power source signal. In use, voltage regulator system 10 then may be used to measure an appropriate phase displacement. Through mechanical attachment to shaft 74, this application may be utilized to accurately position a gun mount, telescope, search-light, or other such devices.

An embodiment of the present invention may be utilized to control voltage being input into an inverter circuit. In this type of device provision is made for precisely varying the input voltage phase displacement from a reference voltage. This embodiment may be applied to a wound rotor induction motor where gearing mechanism 36 actuates the rotor 18. It is evident that if a low resistance were inserted into the rotor circuit, the rotor would be subject to considerable torque resistance forces. However, since as described in this embodiment, the rotor winding is electrically connected to a solid state device firing circuit, the resistance of the rotor circuit will be high. Thus, the current flow small and the torque negligible.

Normally, a resistance is inserted into the rotor of a wound rotor induction motor through slip-rings. The speed of the motor may be changed by varying this resistance. As is well known, by decreasing the resistance, the motor speed increases with the maximum speed asymtatically approaching synchronous speed for the particular frequency of the applied voltage. As the speed increases, the frequency of the voltage induced in the rotor decreases. The limit of the frequency of the voltage being zero in this situation. Conversely, increasing the resistance, decreases the motor speed with the minimum speed approaching a zero limit. As speed decreases, the frequency of the voltage induced in the rotor increases approaching the frequency of the applied voltage as a limit.

When the rotor is held stationary, the frequency of the voltage induced in the rotor will be identical with the frequency of the applied voltage in the stator. Thus, the phase relation of the rotor voltage to the stator voltage will be determined by the position of the rotor with respect to the stator. Therefore, to achieve the necessary voltage relations it is seen that shaft 46 may be mounted to actuate rotor 18 in rotary motion analogous to that shown in FIG. 2 where stator 16 is the element to be moved.

The scope of this invention is to be determined by the appended claims and not limited to the foregoing description and drawings which are illustrative.

What is claimed:
1. A voltage regulation system including:
   a. motor means being driven from an AC source signal having a first phase angle;

b. generator means comprising a stator and a rotor said rotor being rotatably secured to said motor means to produce an output signal;

c. means for rotating said stator with respect to said rotor for producing said output signal with a predetermined second phase angle value with respect to said source signal first phase angle;

d. inverter circuit means having an input connected to said generator and an output for producing an inverter output signal having said second phase angle value; and, e. power transformer means having an input of said source signal and a transformer output signal having said first phase angle, said inverter output signal being summed with said transformer output signal to form a resultant voltage signal.

2. The voltage regulation system as recited in claim 1 where said means for rotating said stator includes gearing means connected to said stator for producing a relative angular displacement between said rotor and said stator of said generator means.

3. The voltage regulation system as recited in claim 2 including:

a. a thumb screw being manually rotatable, said thumb screw having a first set of gear teeth; and, b. a worm wheel having a second set of gear teeth mated to said first set of gear teeth of said thumb screw, said worm wheel being secured to said stator for rotation of said stator responsive to a rotation of said thumb screw.

4. The voltage regulation system as recited in claim 1 where said resultant voltage signal is a vectoral sum of said inverter output signal and said transformer output signal.

5. The voltage regulation system as recited in claim 4 where said source signal is connected in series to said inverter circuit means.

* * * * *